US009335401B2

(12) United States Patent
Chang et al.

(10) Patent No.: US 9,335,401 B2
(45) Date of Patent: May 10, 2016

(54) FULL ANALOG MICROWAVE SENSOR FOR MULTIPLE RANGE SELECTION AND ULTRA-LOW POWER CONSUMPTION

(71) Applicant: U&U ENGINEERING INC, Taipei (TW)

(72) Inventors: Chi-Ho Chang, Taipei (TW); Li-Wei Yu, Taipei (TW); Yi-Ting Yang, Taipei (TW); Yun-Chun Sung, Taipei (TW); Ming-Tsung Hsu, Taipei (TW); Yih-Ming Huang, Taipei (TW); Ping-Chang Tsao, Taipei (TW)

(73) Assignee: U&U ENGINEERING INC., Taipei (TW)

( * ) Notice: Subject to any disclaimer, the term of this patent is extended or adjusted under 35 U.S.C. 154(b) by 220 days.

(21) Appl. No.: 14/155,885

(22) Filed: Jan. 15, 2014

(65) Prior Publication Data

US 2015/0123842 A1      May 7, 2015

(30) Foreign Application Priority Data

Nov. 1, 2013   (TW) .............................. 102139812 A

(51) Int. Cl.
| | |
|---|---|
| *G01S 13/34* | (2006.01) |
| *G01S 7/03* | (2006.01) |
| *G01S 7/35* | (2006.01) |
| *G01S 13/56* | (2006.01) |
| *G01S 13/58* | (2006.01) |
| *G01S 13/00* | (2006.01) |

(52) U.S. Cl.
CPC ... *G01S 7/03* (2013.01); *G01S 7/35* (2013.01); *G01S 13/345* (2013.01); *G01S 13/56* (2013.01); *G01S 13/584* (2013.01)

(58) Field of Classification Search
CPC .............. G01S 7/02; G01S 7/03; G01S 7/35; G01S 7/352; G01S 7/354; G01S 2007/356; G01S 13/02; G01S 13/06; G01S 13/08; G01S 13/32; G01S 13/34; G01S 13/345; G01S 13/50; G01S 13/52; G01S 13/56; G01S 13/58; G01S 13/583; G01S 13/584; G01S 7/28; G01S 7/285; G01S 7/292; G01S 7/2921; G01S 13/325; G01S 13/522; G01S 13/524; G01S 13/53
USPC ................. 342/104–115, 118, 128–133, 175, 342/192–197, 200, 201, 73, 89, 94–97, 27, 342/28
See application file for complete search history.

(56) References Cited

U.S. PATENT DOCUMENTS

| | | | | |
|---|---|---|---|---|
| 3,641,573 A | * | 2/1972 | Albanese | .............. G01S 13/325 342/131 |
| 3,932,871 A | * | 1/1976 | Foote | ...................... G01S 13/56 342/28 |
| 4,292,635 A | * | 9/1981 | Rittenbach | .............. G01S 13/53 342/194 |
| 6,297,764 B1 | * | 10/2001 | Wormington | ......... G01S 7/2921 342/195 |
| 6,731,235 B2 | | 5/2004 | Kishida et al. | |
| 6,972,711 B2 | | 12/2005 | Shono | |
| 8,170,086 B2 | | 5/2012 | Abraham et al. | |

FOREIGN PATENT DOCUMENTS

| | | |
|---|---|---|
| JP | 2011242199 A | 12/2011 |
| TW | I306512 B | 2/2009 |
| TW | M401780 U1 | 4/2011 |

* cited by examiner

*Primary Examiner* — Bernarr Gregory
(74) *Attorney, Agent, or Firm* — Hauptman Ham, LLP

(57) ABSTRACT

A microwave sensor adjusts its sensing range based on a range gate selected from multiple range gates. An active antenna module transmits a first FMCW signal toward a target based on the selected range gate and for receiving second FMCW signal reflected from the target. A modulating module is used for generating modulation signal. The bandwidth of the first FMCW signal depends on an amplitude of the modulation signal. A first demodulator is used for demodulating the first FMCW signal and the second FMCW signal to generate beat frequency. A second demodulator is used to demodulate the beat frequency signal to generate a Doppler signal. An indentifying circuit is used for generating a triggering signal based on a voltage difference between integral of the Doppler signal from an object within the rage gate and an integral of clutter.

13 Claims, 11 Drawing Sheets

FULL ANALOG MICROWAVE SENSOR FOR MULTIPLE RANGE SELECTION AND ULTRA-LOW POWER CONSUMPTION

CROSS REFERENCE TO RELATED APPLICATION

This application claims priority to Taiwan Application Serial Number 102139812, filed on Nov. 1, 2013, which are herein incorporated by reference.

BACKGROUND OF THE INVENTION

1. Field of the Invention

The present invention relates to a microwave sensor, and more particularly, to a full analog microwave sensor for multiple range selections and ultra-low power consumption.

2. Description of the Related Art

Please refer to FIG. 1, FIG. 1 is a schematic diagram showing a structure of a microwave sensor according to the prior art. The microwave sensor 1 comprises a radio frequency module 10, a demodulation circuit 11, an intermediate module 20, a digital signal processor 30, a transmitting antenna 15 and a receiving antenna 16. The radio frequency module 10 comprises a voltage controlled oscillator 12, a power divider 13, a driving amplifier 14, a low noise amplifier 17, and a mixer 18. The demodulation circuit 11 is used for generating the required demodulation signal, and outputting the demodulation signal to the voltage controlled oscillator 12. The voltage controlled oscillator 12 is an electronic oscillating circuit which controls the oscillation frequency in accordance with the input voltage and finally outputs the frequency modulated continuous wave. The transmitting antenna 15 then emits a transmitted wave. However, before the frequency modulated continuous wave passing the emitting antenna 15, the power divider 13 will input a portion of the power output from the voltage controlled oscillator 12 to the mixer 18 so that an intermediate frequency signal is obtained afterwards. The driving amplifier 14 will amplify the frequency modulated continuous wave before the transmitting antenna 15 receives the frequency modulated continuous wave.

The receiving antenna 16 will input the received signal to the mixer 18 after receiving the echo frequency modulated continuous wave. Before the signal is transmitted to the mixer 18, the low noise amplifier 17 will not only amplify the signal but also inhibit noise as possible to allow subsequent electronic components to perform signal processing. The mixer 18 then calculates the frequency difference between the transmitted wave and the echo wave, down converts the frequency difference and outputs the intermediate frequency signal. After that, the back-end intermediate frequency module 20 regulates the range of detection to obtain the information of the target. Finally, the analog signal is converted to the digital signal and sent to the digital signal processor 30. The digital signal processor 30 thus performs Fourier transforms so as to calculate the target range. If the relative velocity is to be measured, mostly the velocity is derived from the time required for the target to pass or calculated from the frequency difference between frequencies of the transmitting and received beat signals.

However, the emitting antenna 15, the receiving antennal 16, and the radio frequency module 10 in the microwave sensor 1 are first independently designed then integrated together. But the microwave sensor 1 performs detecting based on standard radar principle. In other words, the power level is a major reference for the detection range. At the same time, the size of the antenna directly correlates with the operating frequency. When the operating frequency is lower, the antenna size is larger but the 3 dB beamwidth is larger to result in a wide detection range. Conversely, when the operating frequency is higher, the antenna size is smaller but the 3 dB beamwidth is smaller to result in a narrow detection range. Because the adoption of dual antenna would increase the volume, it is very inappropriate to utilize the dual-antenna architecture in the typically miniaturized sensors. But if the carrier frequency is increased, the 3 dB beamwidth of the antenna becomes smaller, which is inappropriate for the detection of moving targets in a wide-angle environment. In addition, the digital signal processor 30 must perform a large number of Fourier transforms to calculate target range and then the calculation of velocity. Hence, the design of the digital signal processor 30 is more complex and does not fulfill the requirements of the low-cost, small-sized (diameter is smaller than 2 cm), and low power consumption (power consumption is less than 1.5 W) products. Moreover, it must be considered how to measure the velocity under the circumstances of range gates (three-stage range gates).

It is therefore very important to design a new microwave sensor. Not only are the antenna and the ratio frequency module integrated but also the design complexity of the digital signal processor is reduced to satisfy the demand for miniaturization.

SUMMARY OF THE INVENTION

An object of the present invention is to provide a full analog microwave sensor for multiple range selections and ultra-low power consumption. The antenna and the RF module are integrated in the microwave sensor. In addition, a plurality of analog circuits are used in the microwave sensor for lowering power consumption of the entire microwave sensor.

According to the present invention, a microwave sensor comprises an active antenna module, a modulating module, a first demodulator, a second demodulator, and an indentifying circuit. The active antenna module is used for transmitting a first FMCW signal toward a target based on a sweep cycle and for receiving second FMCW signal reflected from the target. The modulating module is electrically connected to the active antenna module and is used for generating a modulation signal for the active antenna module according to one range gate chosen from a plurality of range gates. A bandwidth of the first FMCW signal is adjusted depending on an amplitude of the modulation signal. The plurality of range gates correspond to the bandwidth of a plurality of first FMCW signals one on one. The first demodulator is electrically connected to the active antenna module and is used for demodulating a beat frequency signal based on a range gate, and the beat frequency signal comprising a frequency difference between the first FMCW signal and the second FMCW signal. The second demodulator is electrically connected to the first demodulator and is used for demodulating the beat frequency signal to generate a Doppler signal, frequency of the Doppler signal being equal to a frequency difference between an up-sweep beat frequency and a down-sweep beat frequency. The indentifying circuit is electrically connected to the second demodulator and is used for generating a triggering signal based on a voltage difference between an integral of the Doppler signal from an object within the rage gate and an integral of a clutter.

In one aspect of the present invention, the active antenna module comprises a loop antenna and an radio frequency transistor (RF). The loop antenna comprises a transmitting terminal for transmitting the first FMCW signal and a receiving terminal for transmitting the second FMCW signal. The RF transistor comprises a controlling port, a first port, and a second port. The second port is coupled to the transmitting terminal. The controlling terminal is coupled to the receiving terminal. Signal applied on the controlling terminal is a reversed phase of signal applied on the second port.

In another aspect of the present invention, the microwave sensor further comprises: a first low pass filter, electrically connected to the first port of the RF transistor, and the first low pass filter and the RF transistor forming the first demodulator.

In another aspect of the present invention, the second demodulator comprises an AM Peak envelop detector electrically connected to the first low pass filter, and a second low pass filter electrically connected to the AM Peak envelop detector for outputting the Doppler signal.

In another aspect of the present invention, the RF transistor is a bipolar junction transistor (BJT). The controlling port is a base, the first port is an emitter, and the second port is a collector.

In another aspect of the present invention, the RF transistor is a field effect transistor (FET). The FET comprises a P-Hemt. The controlling port is a gate, the first port is a source, and the second port is a drain.

In another aspect of the present invention, the microwave sensor further comprises a first capacitor. The first capacitor comprises two terminals bridging over the first port and the second port of the RF transistor. The loop antenna comprises a first inductor, coupled to the second port of the RF transistor, a second inductor, a third inductor coupled to the controlling port of the RF transistor, a second capacitor coupled between the first inductor and the second inductor, and a third capacitor coupled between the second inductor and the third inductor.

In another aspect of the present invention, the active antenna module comprises a substrate. The substrate comprises a first surface and a second surface facing against the first surface, a first metal microstrip antenna disposed on the first surface of the substrate, a second metal microstrip antenna disposed on the first surface of the substrate, a third metal microstrip antenna, disposed on the first surface of the substrate, a first coupling metallic sheet, disposed on the second surface of the substrate, a second coupling metallic sheet, disposed on the second surface of the substrate, and a third coupling metallic sheet, disposed on the second surface of the substrate. The RF transistor is disposed on the first surface of the substrate. The controlling port of the RF transistor is connected to the third metal microstrip antenna, and the first port and the second port are connected to the first coupling metallic sheet and the first metal microstrip antenna, respectively. A first part of the first metal microstrip antenna and the first coupling metallic sheet form a first capacitor, a second part of the first metal microstrip antenna, a first part of the second metal microstrip antenna adjacent to the first part of the first metal microstrip antenna, and the second coupling metallic sheet form a third capacitor, a second part of the second metal microstrip antenna, the third metal microstrip antenna adjacent to the second part of the second metal microstrip antenna, and the third coupling metallic sheet form a third capacitor.

In another aspect of the present invention, the modulation module comprises a triangular wave generator, a first switch, and a first operational amplifier. The triangular wave generator is used for generating a triangular wave signal. The first switch comprises a plurality of first switching terminals and a first connecting terminal. The first connecting terminal is connected to a fixed voltage terminal. A plurality of first switching terminals are connected to a plurality of resistors one on one. A first operational amplifier comprises a first input positive terminal, a first input negative terminal, and a first output terminal. The first input positive terminal is coupled to a triangular wave signal output by the triangular wave generator. The first input negative terminal is coupled to the first switch for being electrically connected to the fixed voltage terminal according to the first switch, and the first output terminal outputs the modulation signal with various amplitudes.

In another aspect of the present invention, the indentifying circuit comprises a first integrator electrically connected to the second demodulator for calculating the integral of the Doppler signal of the object in the range gate for generating a first comparison voltage, a second integrator electrically connected to the second demodulator for calculating the integral of the clutter signal of the object in the range gate for generating a second comparison voltage, and a comparator electrically connected to the first demodulator and the second demodulator for outputting the triggering signal when the first comparison voltage is larger than the second comparison voltage.

In another aspect of the present invention, an order of first integrator comprises which is smaller than that of the second integrator.

In another aspect of the present invention, the microwave sensor further comprises a retarded controller electrically connected to the comparator for outputting a retard control signal upon receiving the triggering signal.

In another aspect of the present invention, the retarded controller comprises a second switch and a timer. The second switch comprises a plurality of second switching terminals and a second connecting terminal. The second connecting terminal is connected to a fixed voltage terminal, and the plurality of second switching terminals are connected to a plurality of capacitors one on one. The timer comprises a trigger terminal, a discharge terminal, and an output terminal. The trigger terminal is coupled to the triggering signal output by the comparator. The discharge terminal is coupled to the plurality of capacitors. The timer switches according to the second switch so that the discharge terminal is electrically connected to the fixed voltage terminal through one of the second switching terminals.

In contrast to prior art, the present invention microwave sensor is suitable for being applied to the miniaturized sensors which are used for detecting the moving targets at a short range but having a wide coverage angle. Since the oscillator and the mixer of the radio frequency module and the antenna are integrated together, the radio frequency transceiver is simplified and shrunken. At the same time, the voltage controlled oscillator and the mixed are replaced by a BJT or a FET (for example: P-Hemt). Not only the size but also the power consumption is improved obviously. Furthermore, the demodulator of the present invention microwave sensor utilizes the diode in cooperation with the low pass filter to replace the mixer and performs the two-stage down converting and demodulating. Because the present invention microwave sensor directly and rapidly extracts the information for range and velocity from the hardware circuit and calculates the range and velocity, the complexity for designing digital signal processor in the traditional microwave sensor in greatly reduced. Additionally, a speed signal which enlarges instantly or increasingly is regarded as a target to be detected and triggered while the speed of a fixed moving object in the background is taken as a clutter in the present invention. The microwave sensor in the present invention comprises two integrators for calculating the integral of the Doppler signal which the target and the fixed moving object in the background correspond to, respectively, for generating a first comparison voltage and a second comparison voltage. The comparator detects and compares the first comparison voltage and the second comparison voltage. The feature of the present invention is that the target is detected to be within the range gate by comparing the first comparison voltage with the second comparison voltage, which is different from the conventional technology where the amplitude of the detecting object is justified. So the present invention is excellent at resisting interference. In addition, the amplitude of the modulation signal generated by a triangular wave generator is adjusted to modify the RF bandwidth of the FMCW signal to control different detection ranges. A plurality of detection ranges are set in the present invention. A target is sensed only when entering a predetermined detection range. Each of the plurality of range gates is distinct in the present invention. When a moving object is detected, the microwave sensor triggers a secondary device (such as an LED light or an alarm) and enables time control of the secondary device. A plurality of capacitors on the discharge terminal of the timer is connected to the ground through the second switch for controlling and changing the retard time.

These and other features, aspects and advantages of the present disclosure will become understood with reference to the following description, appended claims and accompanying figures.

DETAILED DESCRIPTION OF THE PREFERRED EMBODIMENTS

Figure 1:
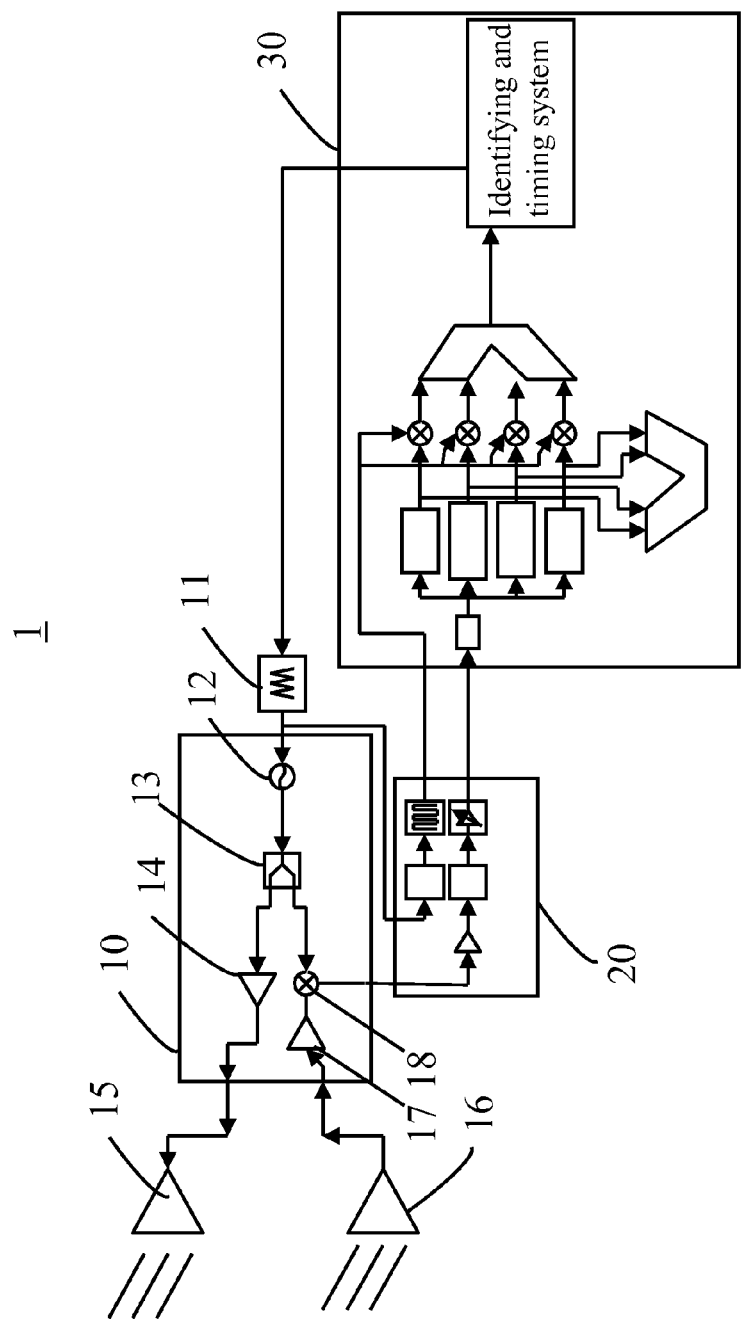
FIG. 1 is a schematic diagram showing a structure of a microwave sensor according to the prior art.
Figure 2:
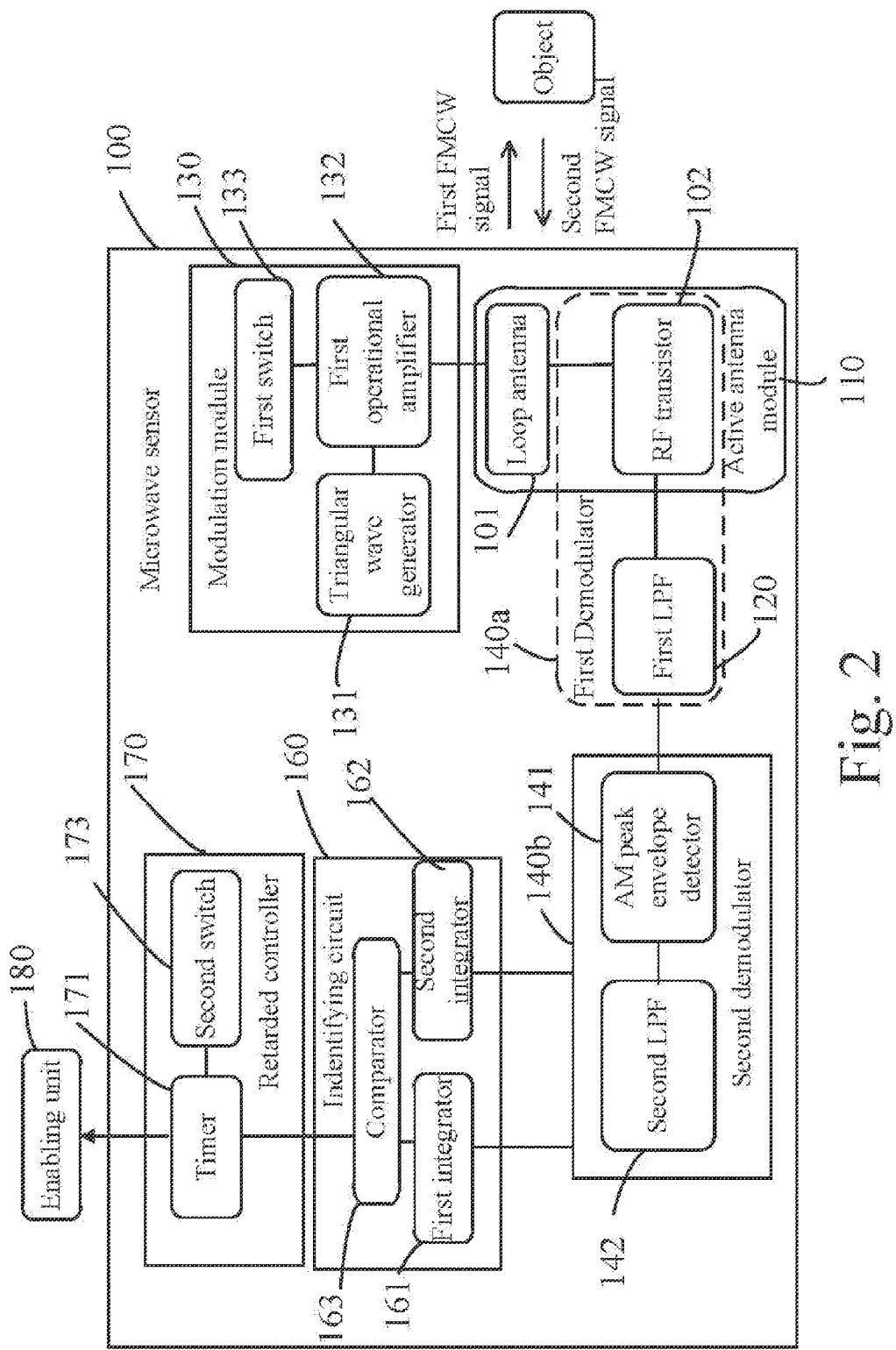
FIG. 2 is a schematic diagram showing a structure of a microwave sensor according to the present invention.

Please refer to FIG. 2 showing a function block diagram (FBD) showing a microwave sensor 100 according to the present invention. The microwave sensor 100 comprises an active antenna module 110, a first low pass filter 120, a modulating module 130, a second demodulator 140b, a first integrator 161, a second integrator 162, a comparator 163, and a retarded controller 170. The active antenna module 110 integrates functions of an antenna and an RF module (radio frequency module). The active antenna module 110 comprises a loop antenna 101 and an RF transistor 102. The loop antenna 101 is used for transmitting a first FMCW signal (frequency modulation continuous wave signal) to an object and receives a second FMCW signal reverberated by the object. The first low pass filter 120 and the RF transistor 102 form a first demodulator 140a. The first demodulator 140a is used for demodulating the first FMCW signal and the second FMCW signal according to a range gate to generate a beat frequency signal. The beat frequency signal comprises a frequency difference between the first FMCW signal and the second FMCW signal. The second demodulator 140b is used for demodulating the beat frequency signal to generate a Doppler signal. The frequency of the Doppler signal is equal to the frequency difference between an up-sweep beat frequency and a down-sweep beat frequency. The modulating module 130 is electrically connected to the active antenna module 110 and used for generating a modulation signal for the active antenna module 110 according to one range gate chosen from a plurality of range gates. The bandwidth of the first FMCW signal is adjusted with the variation of an amplitude of the modulation signal. The plurality of range gates correspond to the bandwidth of a plurality of first FMCW signals one on one. An indentifying circuit 160 is electrically connected to the second demodulator 140b and used for generating a triggering signal based on a voltage difference between an integral of the Doppler signal from an object within the rage gate and an integral of a clutter. The modulating module 130 is used for generating a modulation signal with a specific amplitude based on range of detection. The structure and application of the elements will be elaborated in the following paragraphs.

Figure 3:
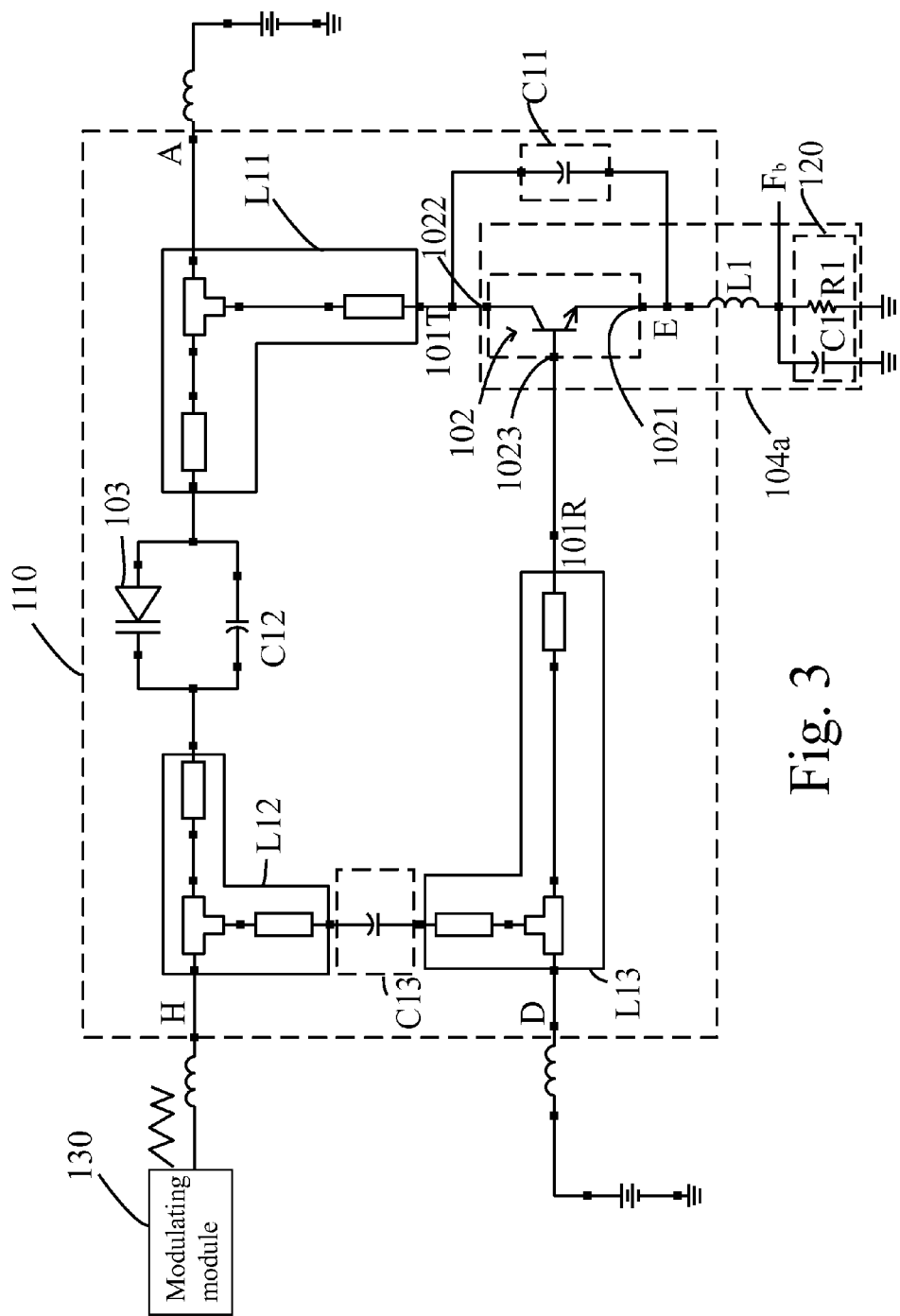
FIG. 3 is an equivalent circuit of the active antenna module in FIG. 2.

Please refer to FIG. 3, FIG. 3 is an equivalent circuit of the active antenna module in FIG. 2. The active antenna module 110, having a self-mixing and self-demodulation architecture, comprises the loop antenna 101 and the radio frequency transistor 102. The loop antenna 101 has a transmitting terminal 101T and a receiving terminal 101R. The transmitting terminal 101T is utilized for transmitting the first FMCW signal, and the receiving terminal 101R is utilized for transmitting the second FMCW signal. The loop antenna 101 comprises a first inductor L11, a second inductor L12, a third inductor L13, a first capacitor C12, a second capacitor C13, a third capacitor C13, and a varactor 103. The radio frequency transistor 102 has a control port 1023, a first port 1021, and a second port 1022. The second port 1022 is coupled to the transmitting terminal 101T, and the control port 1023 is coupled to the receiving terminal 101R. The first port 1021 and the second port 1022 are connected to two ends of the first capacitor C12. The first port 1021 is electrically connected to the first low pass filter 120 and is used as the output terminal for an intermediate frequency (baseband) demodulation signal. The varactor 103 and the second capacitor C13 are connected in parallel.

It is worth noticing that, in FIG. 3, there must be a 180-degree phase difference between the transmitting terminal 101T and the receiving terminal 101R to form a positive feedback circuit so as to obtain good oscillation. In the figure, the radio frequency transistor 102 is represented by a bipolar junction transistor (BJT). Actually, the radio frequency transistor 102 may be a field effect transistor (FET). Under the circumstances of FET, the radio frequency transistor 102 may be a pseudo high electron mobility transistor (P-Hemt). When the radio frequency transistor 102 is a BJT, the control port 1023 is a base electrode. The first port 1021, namely the port for down conversion, is an emitting electrode, and the second port 1022 is a collector electrode. When the radio frequency transistor 102 is a FET, the control port 1023 is a gate electrode. The first port 1021, namely the port for down conversion, is a source electrode, and the second port 1022 is a drain electrode.

Figure 4:
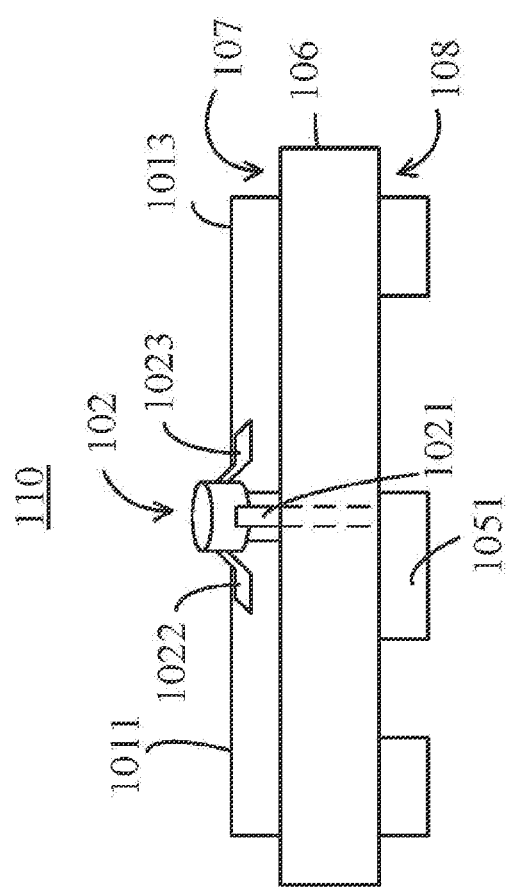
FIG. 4 is a transverse cross-sectional view of a structure of the active antenna module according to the present invention.
Figure 5:
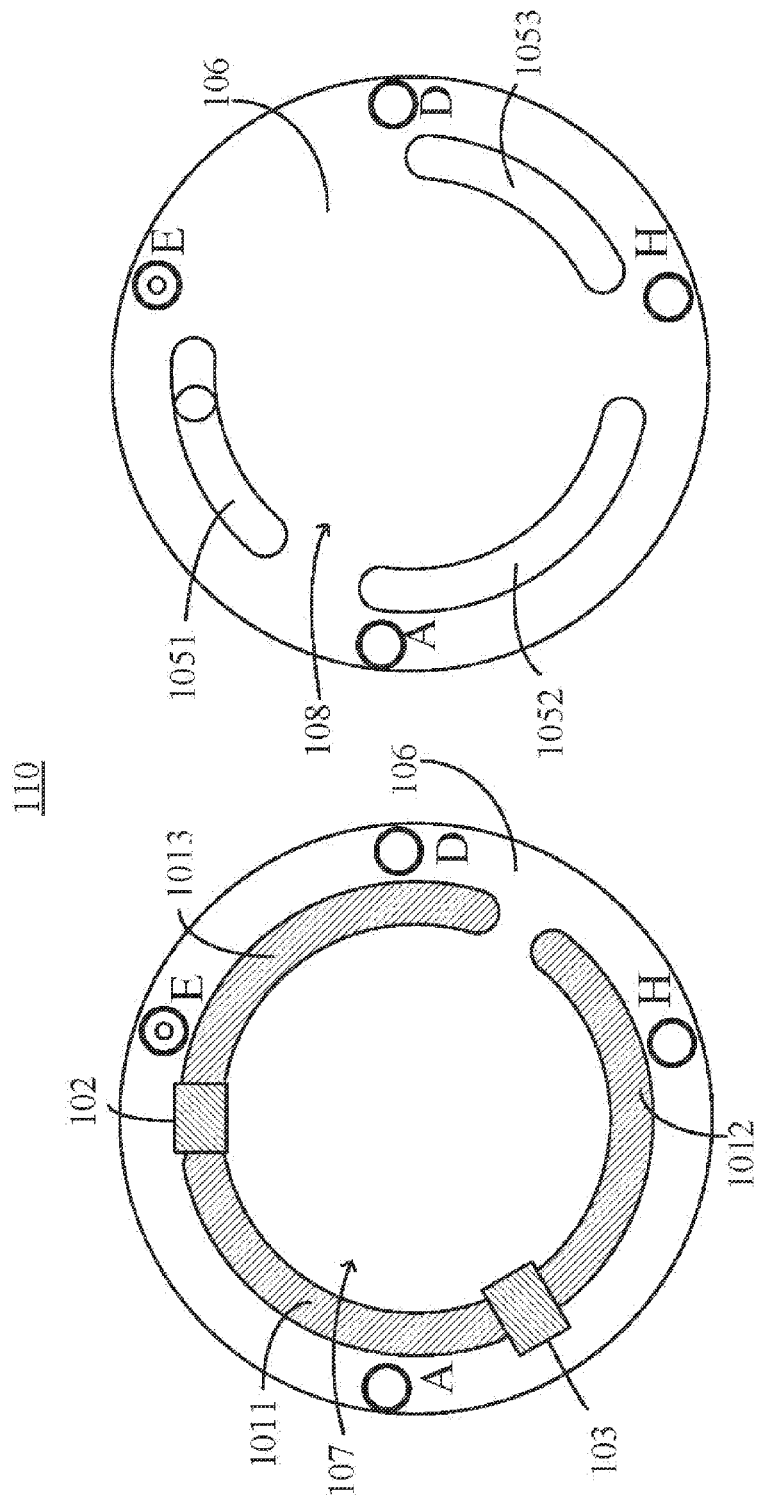
FIG. 5 shows structures on a front side and a back side of the active antenna module in FIG. 4.

Please refer to FIG. 4 and FIG. 5, FIG. 4 is a transverse cross-sectional view of a structure of the active antenna module according to the present invention. FIG. 5 shows structures on a front side and a back side of the active antenna module in FIG. 4. The active antenna module 100 comprises a first metal microstrip antenna 1011, a second metal microstrip antenna 1012, a third metal microstrip antenna 1013, a substrate 106, a radio frequency transistor 102, a first coupling metallic sheet 1051, a second coupling metallic sheet 1052, and a third coupling metallic sheet 1053. The first metal microstrip antenna 1011, the second metal microstrip antenna 1012, and the third metal microstrip antenna 1013 are disposed on a first surface 107 (that is the front side) of the substrate 106. The first coupling metallic sheet 1051, the second coupling metallic sheet 1052, and the third coupling metallic sheet 1053 are disposed on a second surface 108 (that is the back side) of the substrate 106. The first surface 107 and the second surface 108 are opposite faces of the substrate 106. The first metal microstrip antenna 1011, the second metal microstrip antenna 1012, the third metal microstrip antenna 1013, the substrate 106, the first coupling metallic sheet 1051, the second coupling metallic sheet 1052, and the third coupling metallic sheet 1053 constitute the loop antenna 101 shown in FIG. 2. The first metal microstrip antenna 1011, the second metal microstrip antenna 1012, the third metal microstrip antenna 1013, the first coupling metallic sheet 1051, the second coupling metallic sheet 1052, and the third coupling metallic sheet 1053 may be made of copper foils. The first port 1021, the second port 1022, and the control port 1023 of the radio frequency transistor 102 are respectively connected to the first coupling metallic sheet 1051, the first metal microstrip antenna 1011, and the third metal microstrip antenna 1013. The first port 1021 is a port for down conversion that is used as the output terminal for the intermediate frequency (baseband) demodulation signal. Through hole A, through hole H, through hole D, and through hole E all penetrate through the substrate 106, and conducting paths are formed by adhering copper foils on the through holes. The through hole A is connected to the first metal microstrip antenna 1011 and is an input terminal of an antenna power signal. That means, the antenna power signal is input from the first metal microstrip antenna 1011 (equivalent to the first inductor L11 shown in FIG. 3). The through hole H is connected to the second metal microstrip antenna 1012 and is an input terminal for the modulation signal. That means, the through hole H is coupled to the modulation module 130 so that the modulation signal is input from the second metal microstrip antenna 1012 (equivalent to the second inductor L12 shown in FIG. 3), and the modulation signal is a triangular wave or a sine wave. The through hole D is connected to the third metal microstrip antenna 1013 and is an input terminal for a bias voltage for the radio frequency transistor 102. When the radio frequency transistor 102 is a FET, the through hole D may be connected to a fixed voltage (may be a ground terminal). The through hole E is connected to the first coupling metallic sheet 1051.

The active antenna module 100 further comprises the varactor 103 disposed on the first surface 107. Two ends of the varactor 103 are connected to the first metal microstrip antenna 1011 and the second metal microstrip antenna 1012. The capacitance value of the varactor 103 will change in accordance with the voltage applied across the two ends. The varactor 103 is used for tuning a FM signal when the active antenna module 100 is applied to the FM tuner or the FM modulation circuit.

Figure 6:
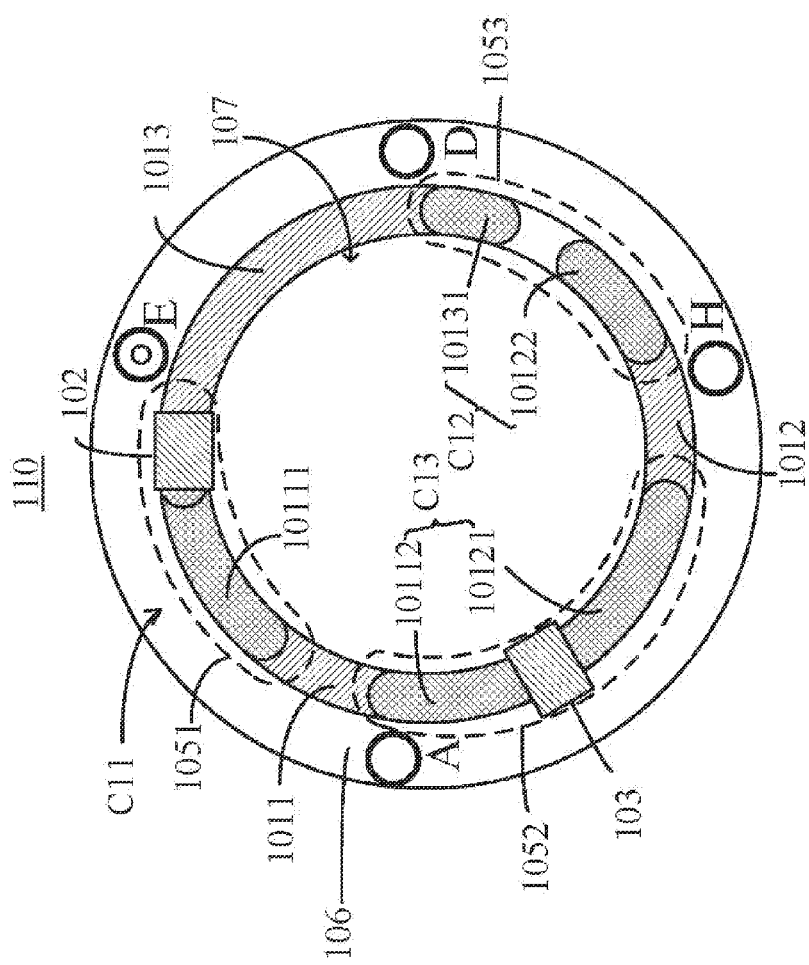
FIG. 6 is a front view of the structure of the active antenna module in FIG. 4.

Please refer to FIG. 6, FIG. 6 is a front view of the structure of the active antenna module in FIG. 4. A first portion 10111 of the first metal microstrip antenna 1011 overlaps the first coupling metallic sheet 1051 to form the first capacitor C12. A second portion 10112 of the first metal microstrip antenna 1011 and a first portion 10121 of the second metal microstrip antenna 1012 adjacent to the second portion 10112 of the first metal microstrip antenna 1011 overlap the second coupling metallic sheet 1052 to form the third capacitor C13. The first metal microstrip antenna 1011 is approximately in an arc shape, and the first portion 10111 and the second portion 10112 are located at both ends of the arcuate structure. A second portion 10122 of the second metal microstrip antenna 1012 and a first portion 10131 of the third metal microstrip antenna 1013 adjacent to the second portion 10122 of the second metal microstrip antenna 1012 overlap the third coupling metallic sheet 1053 to form the second capacitor C13. The second metal microstrip antenna 1012 is approximately in an arc shape, and the first portion 10121 and the second portion 10122 are located at both ends of the arcuate structure. The radio frequency transistor 102 is disposed on the first surface 107. The control port 1023 of the radio frequency transistor 102 is connected to the third metal microstrip antenna 1013.

When designing, the present invention loop antenna 101 must be analyzed through experimental verification. In other words, the present invention active antenna module 110 is transformed into the dual-port circuit shown in FIG. 2. Please also refer to FIG. 6, the circumference of the planar loop antenna 101 is approximately one half of the radio frequency wavelength ($\lambda/2=2\pi_r$). Since the diameter measured from the outer margin of the first metal microstrip antenna 1011, the second metal microstrip antenna 1012, and the third metal microstrip antenna 1013 on the front side is 17.1 mm, the frequency should be higher than 2.79 GHz. However, as shown by the structure in FIG. 6, the copper foils on the back side really form equivalent metal coupling capacitors. Hence, the equivalent length of the LC tank is greater than the circumference, which is 17.1$\pi$ (mm), to allow the antenna frequency to be reduced to below 2.79 GHz. Furthermore, the phase of the radio frequency transistor 102 is controlled. When the variously electrical phase delays inherently existing between the drain electrode and the gate electrode or the collector electrode and the base electrode of the radio frequency transistor 102 combine with the phase delay of the antenna at its operating frequency to make up the phase delay required by a positive feedback (180°), the optimized oscillation condition is achieved. Thus, as indicated by the experimental test result, the oscillation frequency is 2.3-2.4 GHz when AT41486 transistor is utilized as the oscillator. The oscillation frequency is 2.0-2.1 GHz when BFR92 transistor is utilized as the oscillator. The combinations of metal coupling capacitors and various transistors would therefore reduce the oscillation frequency of the antenna having its original size from 2.79 GHz to 2.0-2.1 GHz. As a result, the antenna size is shrunk to miniaturize the antenna.

It is worth noticing that the stability of the loop antenna 101 will be affected when adjusting the metal coupling capacitors. Take the BJT utilized as the radio frequency transistor 102 as an example, the lower the capacitance value of the equivalent metal coupling capacitor that is used as the first capacitor C11 is, the lower the internal impedance of the radio frequency transistor 102 is to increase the base current $I_B$, based on simple small-signal model equation of BJT. The increased base current $I_B$ will cause the collector current $I_C$ increase.

Hence, the spectrum stability of the loop antenna 101 caused by radio frequency oscillation is improved. Furthermore, in the design shown in FIG. 2, the magnitude of the current must be considered when designing the oscillating sensor to ensure good operation. That means, the base current $I_B$, the emitting current $I_E$, and the collector current $I_C$ must be considered when the radio frequency transistor 102 is a BJT. But when the radio frequency transistor 102 is a FET, the gate voltage $V_G$, the source current $I_S$, and the drain current $I_D$ must be considered. For example, special attention should be paid to the design because the emitting current $I_E$ decides the radiation signal strength and consequently affects the sensing range directly. It is understandable that the operating point of the oscillator may be decided by the bias voltage. Theoretical value is very easy to find, but the optimized point must be obtained by experimental verification. The optimized point is found from the conditions having a signal to noise (S/N) ratio higher than the required S/N ratio.

In this structure, the desired equivalent inductance value and the desired equivalent capacitance value are achieved by selecting the first metal microstrip antenna sheet 1011, the second metal microstrip antenna sheet 1012, the third metal microstrip antenna sheet 1013, the first coupling metallic sheet 1051, the second coupling metallic sheet 1052, and the third coupling metallic sheet 1053. As mentioned previously, by designing the lengths of the metal coupling capacitors, the operating frequency of the loop antenna 101 is adjusted toward the lower frequency. In other words, the equivalent length for the half wavelength (λg/2) is elongated. In addition, the operating point of the radio frequency transistor 102 is adjusted to compensate the inadequate phase. Finally, the first metal microstrip antenna sheet 1011, the second metal microstrip antenna sheet 1012, the third metal microstrip antenna sheet 1013, the first coupling metallic sheet 1051, the second coupling metallic sheet 1052, and the third coupling metallic sheet 1053 are designed in a manner so that they are used as the resonator when the radio frequency transistor 102 resonates.

Please refer to FIG. 2 and FIG. 3 again, the operating frequency of the present invention loop antenna 101 is decided by the inductance value L of the loop antenna 101 (relevant to the lengths of the first metal microstrip antenna sheet 1011, the second metal microstrip antenna sheet 1012, and the third metal microstrip antenna sheet 1013) and the capacitance value C contributed by the first capacitor C11, the second capacitor C12, and the third capacitor C13 (relevant to the lengths of the first capacitor C11, the second capacitor C12, and the third capacitor C13). The larger the LC value is, the lower the radio frequency oscillation frequency is. Conversely, the smaller the LC value is, the higher the radio frequency oscillation frequency is. However, it is worth noticing that the radio frequency stability is closely related to the selection of the coupling capacitor and the bypass capacitor. When the radio frequency transistor 102 is a BJT, according to the simple small-signal model equation $I_C=\beta I_B$, the smaller the capacitance value of the first capacitor C11, the lower the internal impedance of the radio frequency transistor 102 is to cause the β value increase. That means, the collector current $I_C$ is increased to improve the radio frequency stability of the loop antenna 101. When the radio frequency transistor 102 is a FET, the simple small-signal model equation of FET is as follows:

$$I_D = I_{DSS}\left(1 - \frac{V_{GS}}{V_P}\right)^2,$$

where $V_P$ is the pinch-off voltage, $V_{GS}$ is the gate-source voltage, Ioss is the drain-source saturation current. The smaller the capacitance value of the first capacitor C11 is, the lower the internal impedance $r_{DS}$ of the radio frequency transistor 102 is. Since $V_{DS}=r_{DS}\times I_D$, the current $I_D$ is relatively increased under the circumstances of constant input voltage (the drain-source voltage $V_{DS}$ is a constant value).

In summary, in this circuit design, the lower the capacitance values of the first capacitors C11 is, the more stable the radio frequency oscillation is. That is, on the frequency spectrum distribution, the harmonic energy is decreased but the domain energy is increased. Conversely, the higher the capacitance values of the first capacitors C11 is, the less stable the radio frequency oscillation is. That is, on the frequency spectrum distribution, the harmonic energy is increased but the domain energy is decreased. As for the coupling capacitors C12, C13, their effects are just opposite to that of the first capacitor C11. The higher the capacitance values of the coupling capacitors C12, C13 are, the more stable the system is. That is, on the frequency spectrum distribution, the harmonic energy is decreased but the domain energy is increased. Conversely, the lower the capacitance values of the coupling capacitors C12, C13 are, the less stable the system is. That is, on the frequency spectrum distribution, the harmonic energy is increased but the domain energy is decreased.

When the structure of the equivalent model shown in FIG. 3 is compared with a standard radar structure, metal (or copper foil) on the front side and metal (or copper foil) on the back side are equivalent to the loop antenna structure if it is equivalent to a standard radar antenna. In addition, when it is used as a voltage controlled oscillator, the loop antenna and the metal stripes are respectively equivalent to the equivalent inductor (L) and the equivalent capacitor (C), and together constitute the resonant cavity of the transistor. In the present invention active antenna module 100, the radio frequency transistor 102 also has the functions of the voltage controlled oscillator and the mixer. The first metal microstrip antenna sheet 1011, the second metal microstrip antenna sheet 1012, the third metal microstrip antenna sheet 1013, the first coupling metallic sheet 1051, the second coupling metallic sheet 1052, and the third coupling metallic sheet 1053 are designed in a manner so that they are used as the resonator when the radio frequency transistor 102 resonates. When it is used as the mixer, the bias voltage applied to the base is utilized for driving the radio frequency transistor 102 to operate near the saturation region so as to detect the intermediate frequency signal at the emitter.

Please refer to FIG. 3, since the radio frequency transistor 102 of the active antenna module 110 functions as the mixer, the radio frequency transistor 102 and the first low pass filter 120 may act as the first demodulator 140a to down convert and demodulate the first FMCW signal and the second FMCW signal for the first time so as to obtain the beat signal. That means, when the second port 1022 of the radio frequency transistor 102 serves as the transmitting terminal 101T for the first FMCW signal (with a frequency $f_t$) and the control port 1023 serves as the receiving terminal 101R for the second FMCW signal (with a frequency $f_r$) reflected back from the target, the first port 1021 outputs the beat signal. The frequency of the beat signal $f_b(=f_t-f_r)$ can be utilized for calculating and obtaining the range between the microwave sensor 100 and the target. The method is elaborated in detail as follows.

Figure 7:
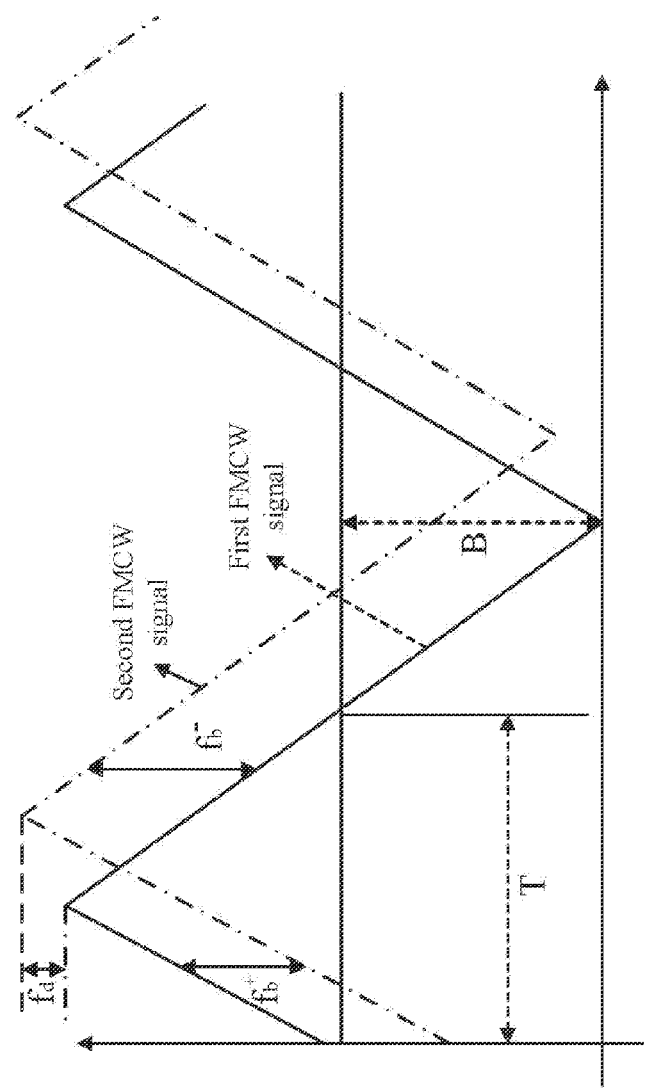
FIG. 7 is a plot of the frequency of the first FMCW signal transmitted from the microwave sensor and the frequency of the second FMCW signal received by the microwave sensor versus time according to the present invention.

Please refer to FIG. 7, FIG. 7 is a plot of the frequency of the first FMCW signal transmitted from the microwave sensor 100 and the frequency of the second FMCW signal received by the microwave sensor 100 versus time according to the present invention. The up-sweep beat frequency $f_b^+$ and the down-sweep beat frequency $f_b^-$ represent the differences between the frequencies of the first FMCW signal and the second FMCW signal when sweeping upward and downward, respectively. When there is no relative movement between the target and the microwave sensor 100, $f_b = f_b^+ = f_b^+$. When the target moves towards the microwave sensor 100, $f_b^+ = f_b - f_d$, $f_b^- = f_b + f_d$, and $f_d$ represents the frequency of the Doppler signal. When the target moves away from the microwave sensor 100, $f_b^- = f_b - f_d$, $f_b^+ = f_b + f_d$. Hence, $f_b = (f_b^- + f_b^+)/2$.

Figure 8:
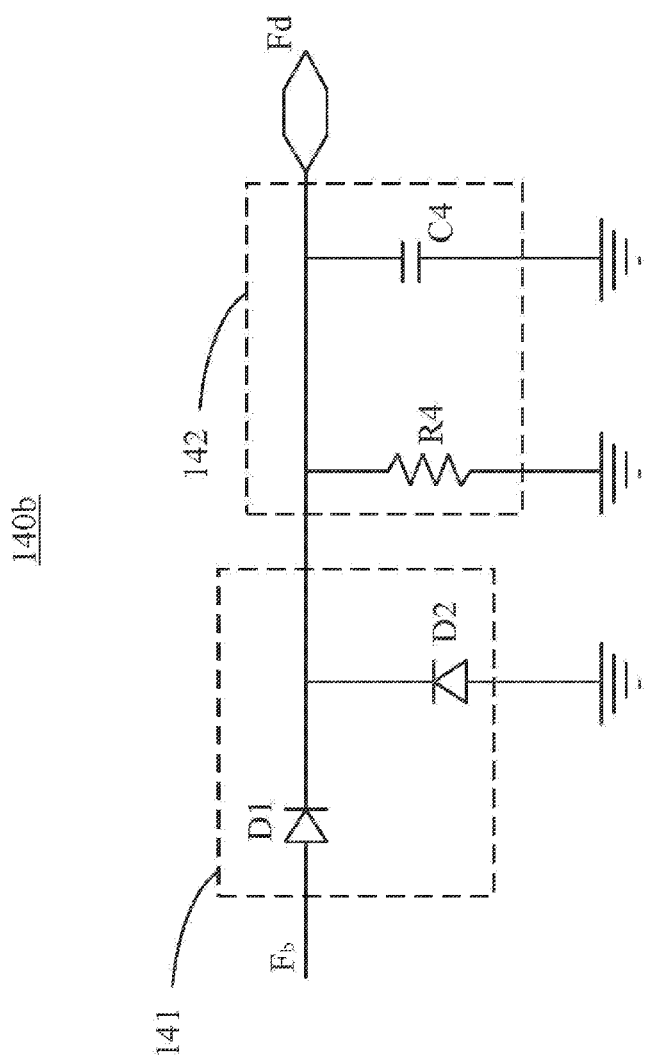
FIG. 8 is a circuit diagram of the second demodulator.

Please refer to FIG. 8, FIG. 8 is a circuit diagram of the second demodulator 140b. The second demodulator 140b comprises an AM peak envelope detector 141 and a second low pass filter 142. The AM peak envelope detector 141, being electrically connected to the first port 121 of the radio frequency transistor 102, comprises diodes D1 and D2. A positive terminal of the diode D1 is coupled to the first port 121 of the radio frequency transistor 102. A negative terminal of the diode D1 is coupled to the second low pass filter 142. A positive terminal of the diode D2 is coupled to the ground terminal. A negative terminal of the diode D2 is coupled to the second low pass filter 142. The AM peak envelope detector 141 is utilized for extracting two signals having frequencies of $f_b^- + f_b^+$ and $f_b^- - f_b^+$ from the beat signal $f_b$ according to the AM peak envelope detection. The Doppler signal is then obtained by utilizing the second low pass filter 142, and the Doppler signal has the frequency of $f_d = |f_b^- - f_b^+|$.

Figure 9:
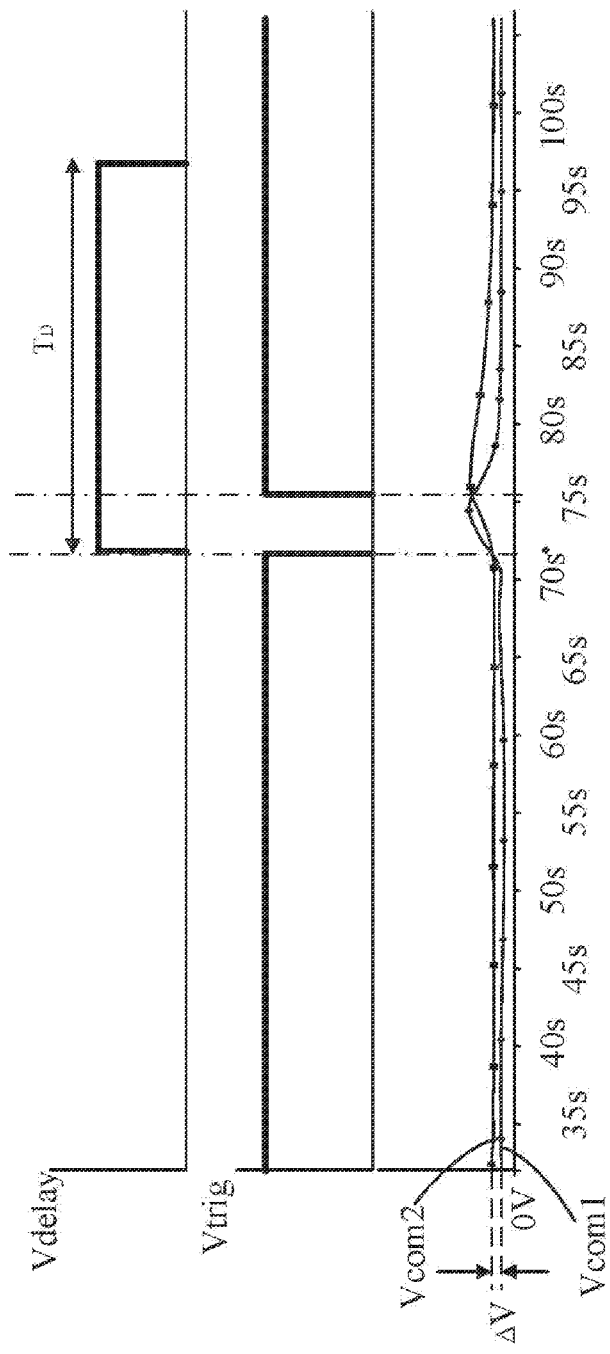
FIG. 9 is a relation diagram of clutter, target signal, triggering signal, and retard control signal.

Refer to FIG. 2 and FIG. 9. FIG. 9 is a relation diagram of the clutter, the target signal, a triggering signal Vtrig, and a retard control signal Vdelay. The identifying circuit 160 adopts an analog circuit, instead of the digital signal processor, to differentiate the Doppler signal generated by the analog circuit from the clutter. The first integrator 161 is used for calculating the integral of the Doppler signal of the object in the range gate to generate a first comparison voltage Vcom1. The second integrator 162 is used for calculating the integral of the clutter signal of the object in the range gate to generate a second comparison voltage Vcom2. It is notified that the order of the first integrator 161 is smaller than that of the second integrator 162; that is, the charge/discharge speed of the first integrator 161 is larger than that of the second integrator 162. The comparator 163 is used for outputting a triggering signal Vtrig to the enabling unit 180 when the first comparison voltage Vcom1 is larger than the second comparison voltage Vcom2. The principle of the identifying circuit 160 is that the difference between the Doppler signal and the clutter is differentiated based on two parameters—slope and voltage drop. Also, the Doppler signal and the clutter of the object are differed through two integrators with different orders and the speed of the integral of the speed signal. As shown in FIG. 9, the first comparison voltage Vcom1 output by the first integrator 161 is smaller than the second comparison voltage Vcom2 output by the second integrator 162, and a difference of potential ΔV exists in the first comparison voltage Vcom1 and the second comparison voltage Vcom2 when on objects enters the range gate set by the microwave sensor 100. The difference of potential ΔV refers to the maximal amount of clutter which the microwave sensor 100 can bear. When the object enters the range gate set by the microwave sensor 100, the first integrator 161 calculates the integral of the Doppler signal generated by the second demodulator 140b which is for the object to obtain the first comparison voltage Vcom1. At this time, the first comparison voltage Vcom1 is larger than the second comparison voltage Vcom2, and the comparator 163 generates the triggering signal Vtrig to the retarded controller 170 or the enabling unit 180.

The enabling unit 180 controls the operation of a postgrade circuit upon receiving the triggering signal. For example, the enabling unit 180 controls an LED to produce light or an alarm to give off alarms.

Figure 10:
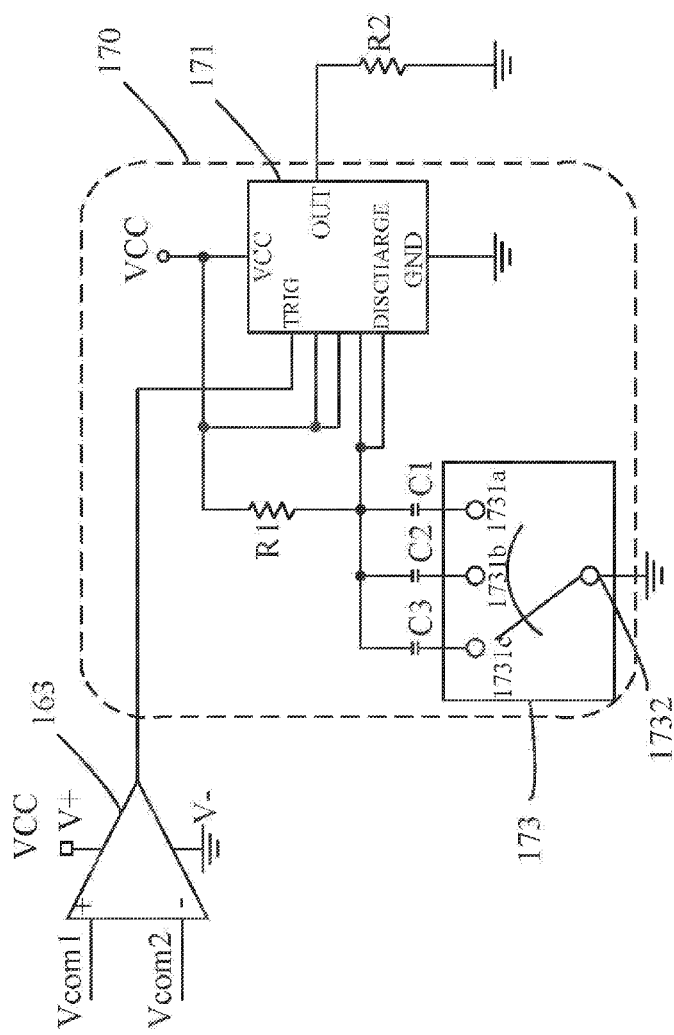
FIG. 10 is a circuit diagram showing the retarded controller as shown in FIG. 2.

Please refer to FIG. 9 and FIG. 10. FIG. 10 is a circuit diagram showing the retarded controller 170 as shown in FIG. 2. The comparator 163 generates a triggering signal Vtrig. If the pulse wave is shocked, the comparator 163 sends out the triggering signal Vtrig on and off. At this time, the enabling unit 180 is enabled on and off. For example, the illumination system flickers, and the security system alarms on and off. The microwave sensor 100 further comprises the retarded controller 170 for outputting the retard control signal Vdelay upon receiving the triggering signal Vtrig. The enabling unit 180 increases an enabling duration TD upon receiving the retard control signal Vdelay. The retarded controller 170 comprises a second switch 173 and a timer 171. The second switch 173 comprises a plurality of second switching terminals 1731a-1731c and a second connecting terminal 1732. The second connecting terminal 1732 is connected to a fixed voltage terminal (such as a ground terminal). The plurality of second switching terminals 1731a-1731c are connected to a plurality of capacitors C1-C3 one on one. Each of the plurality of capacitors C1-C3 has an individual capacitance. The timer 171 comprises a trigger terminal TRIG, a discharge terminal DISCHARGE, and an output terminal OUT. The trigger terminal TRIG is coupled to the triggering signal Vtrig of the comparator 163. The discharge terminal DISCHARGE is coupled to the plurality of capacitors C1-C3. The timer 171 switches according to the second switch 173. The discharge terminal DISCHARGE is electrically connected to the fixed voltage terminal through one of the second switching terminals. The output terminal OUTPUT outputs retard control signals Vdelay with diverse lengths to the enabling unit 180. The length of the retard control signals Vdelay varies with RC values (product of the resistor R1 and one of the capacitors C1-C3). The length of the retard control signals Vdelay can be controlled by the second switch 173. For example, the length of the retard control signals Vdelay is set as 17 seconds, and the 180 can operates at least 17 seconds after being enabled.

Figure 11:
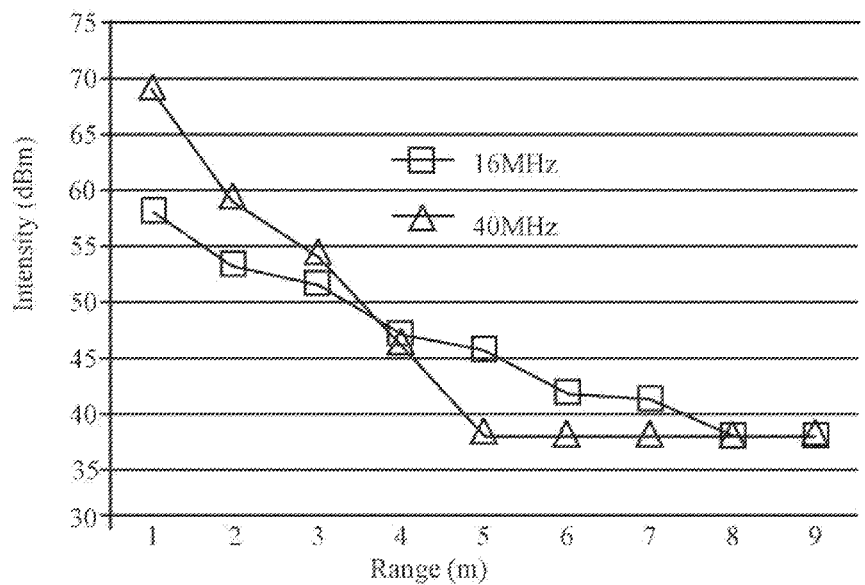
FIG. 11 is a relation diagram showing the relationship between sweep bandwidth and range.

Please refer to FIG. 11. FIG. 11 is a relation diagram showing the relationship between sweep bandwidth and ranges. The first FMCW signal transmits to different objects with different ranges in the sweep frequency of 16 MHz and 40 MHz in 12V operating voltage as shown in FIG. 11. It is found that all of the energy is concentrated within a range of 4 meters while rapidly disappearing from a range of 4 meters with an increase of the range in the sweep frequency of 40 MHz. The energy is more evenly distributed within a range of 7 meters in the sweep frequency of 16 MHz. The larger the sweep bandwidth B (which is equal to the RF bandwidth Δf of the first FMCW signal) is, the smaller the detecting range of the microwave sensor 100 becomes. And, the smaller the sweep bandwidth B is, the larger the detecting range of the microwave sensor 100 becomes.

Figure 12:
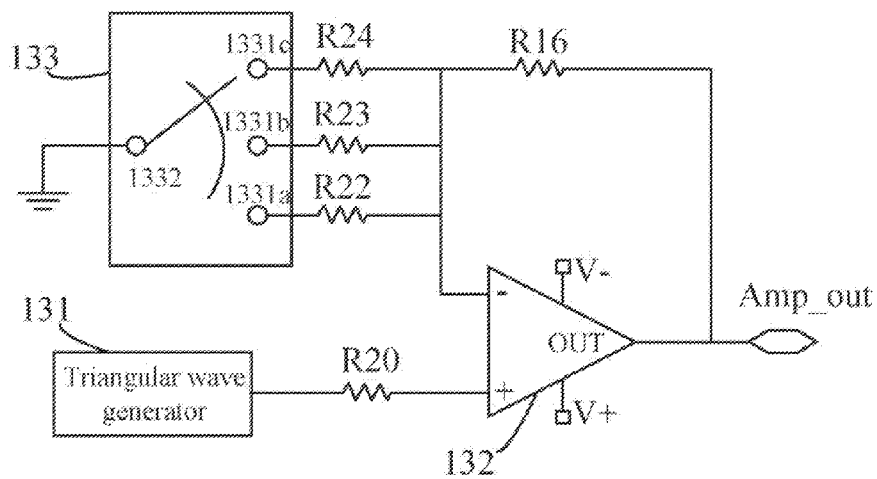
FIG. 12 is a circuit diagram showing the modulating module 130 as shown in FIG. 2.

Please refer to FIG. 2, FIG. 11, and FIG. 12 at a time. FIG. 12 is a circuit diagram showing the modulating module 130 as shown in FIG. 2. The modulating module 130 comprises a triangular wave generator 131, a first operational amplifier 132, and a first switch 133. The RF bandwidth Δf of the first FMCW signal is directly affected by the amplitude of the modulation signal generated by the triangular wave generator 131. The larger the amplitude of the modulation signal is, the larger the RF bandwidth Δf becomes. Otherwise, the smaller the amplitude of the modulation signal is, the smaller the RF bandwidth Δf becomes. So when the detecting range of the microwave sensor 100 needs to be increased, the RF bandwidth Δf of the first FMCW signal needs to be decreased. Otherwise, when the detecting range of the microwave sensor 100 needs to be decreased, the RF bandwidth Δf of the first FMCW signal needs to be increased.

A plurality of range gates (i.e., a plurality of ranges of detection) are set in the microwave sensor 100 according to the embodiment of the present invention. Each of the plurality of range gates corresponds to the RF bandwidth Δf of an FMCW signal. The RF bandwidth Δf of each FMCW signal f corresponds to an amplitude of a modulation signal. If the range gate of the range gate of the microwave sensor 100 is set as 4 meters, the triangular wave generator 131 generates a corresponding triangular wave signal to generate a first FMCW signal with 40 MHz. An object which is outside from the range gate of 4 meters reflects a second FMCW signal. The energy of the second FMCW signal is much smaller than the energy of a second FMCW signal reflected by an object within the range gate of 4 meters. So the first comparison voltage Vcom1 produced by the first integrator 161 is still lower than the second comparison voltage Vcom2 produced by the second integrator 162 so the 163 does not output the triggering signal Vtrig. Thus, the microwave sensor 100 overlooks the second FMCW signal reflected by the object outside from the range gate of 4 meters. According to the description, the microwave sensor 100 controls the amplitude of the modulation signal generated by the triangular wave generator 131 to set a plurality of range gates. Each of the plurality of range gates corresponds to a detecting range. Only within the detecting range can an object can be detected. Each of the plurality of range gates is distinct in the present invention.

The first switch 133 of the modulating module 130 comprises a plurality of first switches 1331a-1331c and a first connecting terminal 1332. The first connecting terminal 1332 is connected to the fixed voltage terminal (such as the ground terminal). The plurality of first switching terminals 1331a-1331c are connected to a plurality of capacitors R22-R24 one on one. The 132 comprises a first input positive terminal, a first input negative terminal, and a first output terminal Amp_out. The first input positive terminal is coupled to a triangular wave signal of the triangular wave generator 131. The first input negative terminal is coupled to the first switch 133. The first input negative terminal switches to let the first negative terminal pass through one of the plurality of first switching terminals 1331a-1331c and be electrically connected to the fixed voltage terminal according to the first switch 133. The first output terminal Amp_out outputs the modulation signal with different amplitudes. Preferably, the triangular wave generator 131 generates the triangular wave signal with 40 KHz and an amplitude of 0-3V to prevent the signal from saturation. The amplitude of the triangular wave signal is controlled to change the modulation bandwidth of the active antenna module 110 so that the range gate can be controlled. A resistor is used with the first switch 133 for adjusting the magnify power of the triangular wave signal. In the end, the first operational amplifier 132 magnifies the triangular wave signal output by the triangular wave generator 131 and outputs a modulation signal with a specific amplitude according to the chosen magnify power. The frequency range of the FMCW signal is positively proportional to the modulation signal, so the frequency range of the FMCW signal can be added to 40K-100 KHz from 1K-10 KHz. In this way, the frequency range of the middle frequency filter with which the range parameter is detected subsequently can be increased, preventing the low frequency noise from interrupting, thereby, separating low frequency interference signals effectively.

The speed signal which enlarges instantly or increasingly is regarded as a target to be detected and triggered while the speed of a fixed moving object in the background is taken as a clutter in the present invention. The microwave sensor in the present invention comprises two integrators for calculating the integral of the Doppler signal which the target and the fixed moving object in the background correspond to, respectively, for generating a first comparison voltage and a second comparison voltage. The comparator detects and compares the first comparison voltage and the second comparison voltage. The feature of the present invention is that the target is detected whether to be within the range gate or not by comparing the first comparison voltage with the second comparison voltage, which is different from the conventional technology where the amplitude of the detecting object is detected. So the present invention is excellent at resisting interference. In addition, the amplitude of the modulation signal generated by a triangular wave generator is adjusted to modify the RF bandwidth of the FMCW signals to control different detection ranges. A plurality of detection ranges are set in the present invention. A target is sensed only when entering a predetermined detection range. Each of the plurality of range gates is distinct in the present invention. When a moving object is detected, the microwave sensor triggers a secondary device (such as an LED light or an alarm) and enables time control of the secondary device. A plurality of capacitors on the discharge terminal of the timer is connected to the ground through the second switch for controlling and changing the retard time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A microwave sensor, comprising:
   an active antenna module, for transmitting a first FMCW signal toward a target based on a sweep cycle and for receiving second FMCW signal reflected from the target;
   a modulating module electrically connected to the active antenna module, for generating a modulation signal for the active antenna module according to one range gate chosen from a plurality of range gates, bandwidth of the first FMCW signal being adjusted depending on an amplitude of the modulation signal, and the plurality of range gates corresponding to the bandwidth of a plurality of first FMCW signals one on one;
   a first demodulator electrically connected to the active antenna module, for demodulating a beat frequency signal based on a range gate, and the beat frequency signal comprising a frequency difference between the first FMCW signal and the second FMCW signal;
   a second demodulator electrically connected to the first demodulator, for demodulating the beat frequency signal to generate a Doppler signal, frequency of the Doppler signal being equal to a frequency difference between an up-sweep beat frequency and a down-sweep beat frequency; and
   an indentifying circuit electrically connected to the second demodulator, for generating a triggering signal based on a voltage difference between an integral of the Doppler signal from an object within the range gate and an integral of a clutter.

2. The microwave sensor as claimed in claim 1, wherein the active antenna module comprises:
   a loop antenna, comprising a transmitting terminal for transmitting the first FMCW signal and a receiving terminal for transmitting the second FMCW signal; and
   a radio frequency (RF) transistor, comprising a controlling port, a first port, and a second port, the second port being coupled to the transmitting terminal, the controlling terminal being coupled to the receiving terminal, and signal applied on the controlling terminal being a reversed phase of signal applied on the second port.

3. The microwave sensor as claimed in claim 2, wherein the microwave sensor further comprises: a first low pass filter, electrically connected to the first port of the RF transistor, and the first low pass filter and the RF transistor forming the first demodulator.

4. The microwave sensor as claimed in claim 3, wherein the second demodulator comprises:
   an AM Peak envelope detector, electrically connected to the first low pass filter; and
   a second low pass filter, electrically connected to the AM Peak envelope detector, for outputting the Doppler signal.

5. The microwave sensor as claimed in claim 2, wherein the RF transistor is a bipolar junction transistor (BJT), the controlling port is a base, the first port is an emitter, and the second port is a collector.

6. The microwave sensor as claimed in claim 2, wherein the RF transistor is a field effect transistor (FET), the FET comprises a P-Hemt, the controlling port is a gate, the first port is a source, and the second port is a drain.

7. The microwave sensor as claimed in claim 2, wherein the microwave sensor further comprises a first capacitor, the first capacitor comprises two terminals bridging over the first port and the second port of the RF transistor, and the loop antenna comprises:
   a first inductor, coupled to the second port of the RF transistor;
   a second inductor;
   a third inductor, coupled to the controlling port of the RF transistor;
   a second capacitor, coupled between the first inductor and the second inductor; and
   a third capacitor, coupled between the second inductor and the third inductor.

8. The microwave sensor as claimed in claim 2, wherein the active antenna module comprises:
   a substrate comprising a first surface and a second surface facing against the first surface;
   a first metal microstrip antenna, disposed on the first surface of the substrate;
   a second metal microstrip antenna, disposed on the first surface of the substrate;
   a third metal microstrip antenna, disposed on the first surface of the substrate;
   a first coupling metallic sheet, disposed on the second surface of the substrate;
   a second coupling metallic sheet, disposed on the second surface of the substrate; and
   a third coupling metallic sheet, disposed on the second surface of the substrate;
   the RF transistor, disposed on the first surface of the substrate, the controlling port of the RF transistor being connected to the third metal microstrip antenna, and the first port and the second port being connected to the first coupling metallic sheet and the first metal microstrip antenna, respectively;
   wherein a first part of the first metal microstrip antenna and the first coupling metallic sheet form a first capacitor, a second part of the first metal microstrip antenna, a first part of the second metal microstrip antenna adjacent to the first part of the first metal microstrip antenna, and the second coupling metallic sheet form a third capacitor, a second part of the second metal microstrip antenna, the third metal microstrip antenna adjacent to the second part of the second metal microstrip antenna, and the third coupling metallic sheet form a third capacitor.

9. The microwave sensor as claimed in claim 1, wherein the modulation module comprises:
   a triangular wave generator, for generating a triangular wave signal;
   a first switch, comprising a plurality of first switching terminals and a first connecting terminal, the first connecting terminal being connected to a fixed voltage terminal, a plurality of first switching terminals being connected to a plurality of resistors one on one; and
   a first operational amplifier, comprising a first input positive terminal, a first input negative terminal, and a first output terminal, the first input positive terminal being coupled to a triangular wave signal output by the triangular wave generator, the first input negative terminal being coupled to the first switch for being electrically connected to the fixed voltage terminal according to the first switch, and the first output terminal outputting the modulation signal with various amplitudes.

10. The microwave sensor as claimed in claim 1, wherein the indentifying circuit comprises:
    a first integrator, electrically connected to the second demodulator, for calculating the integral of the Doppler signal of the object in the range gate for generating a first comparison voltage;
    a second integrator, electrically connected to the second demodulator, for calculating the integral of the clutter signal of the object in the range gate for generating a second comparison voltage; and
    a comparator, electrically connected to the first demodulator and the second demodulator, for outputting the triggering signal when the first comparison voltage is larger than the second comparison voltage.

11. The microwave sensor as claimed in claim 10, wherein an order of the first integrator is smaller than that of the second integrator.

12. The microwave sensor as claimed in claim 10, wherein the microwave sensor further comprises a delayed controller, and the delayed controller electrically connected to the comparator for outputting a delay control signal upon receiving the triggering signal.

13. The microwave sensor as claimed in claim 12, wherein the delayed controller comprises:
    a second switch, comprising a plurality of second switching terminals and a second connecting terminal, the second connecting terminal being connected to a fixed voltage terminal, and the plurality of second switching terminals being connected to a plurality of capacitors one on one; and
    a timer, comprising a trigger terminal, a discharge terminal, and an output terminal, the trigger terminal being coupled to the triggering signal output by the comparator, the discharge terminal being coupled to the plurality of capacitors, and the timer switching according to the second switch so that the discharge terminal is electrically connected to the fixed voltage terminal through one of the second switching terminals.

* * * * *